United States Patent
Igarashi et al.

(10) Patent No.: US 6,214,418 B1
(45) Date of Patent: Apr. 10, 2001

(54) THERMOSETTING, HIGH-SOLIDS COATING COMPOSITION AND METHOD OF FORMING TOPCOAT BY USING THE SAME

(75) Inventors: Hiroshi Igarashi, Yokohama; Hiroshi Kitagawa, Hiratsuka; Yasumasa Okumura, Yokohama; Masaaki Saika; Kenichi Nagai, both of Hiratsuka; Motoshi Yabuta, Hadano, all of (JP)

(73) Assignee: Kansai Paint Co., Ltd., Amagasaki (JP)

( * ) Notice: Subject to any disclaimer, the term of this patent is extended or adjusted under 35 U.S.C. 154(b) by 0 days.

(21) Appl. No.: 09/462,839

(22) PCT Filed: Jul. 7, 1998

(86) PCT No.: PCT/JP98/03052

§ 371 Date: Jan. 14, 2000

§ 102(e) Date: Jan. 14, 2000

(87) PCT Pub. No.: WO99/03939

PCT Pub. Date: Jan. 28, 1999

(30) Foreign Application Priority Data

Jul. 16, 1997 (JP) .................................................. 9-190341

(51) Int. Cl.$^7$ ...................................................... B05D 1/36
(52) U.S. Cl. .................. 427/407.1; 427/410; 427/412.1; 428/447; 428/450; 428/457; 525/100; 525/101; 525/107

(58) Field of Search .................................. 427/407.1, 410, 427/412.1; 525/100, 101, 107; 428/447, 450, 457

(56) References Cited

FOREIGN PATENT DOCUMENTS

| 7-331165 | 12/1995 | (JP) . |
|---|---|---|
| 8-27414 | 1/1996 | (JP) . |
| 9-100439 | 4/1997 | (JP) . |
| 9-143421 | 6/1997 | (JP) . |
| 99/02619 | * 1/1999 | (WO) . |

* cited by examiner

*Primary Examiner*—Erma Cameron
(74) *Attorney, Agent, or Firm*—Armstrong, Westerman, Hattori, McLeland & Naughton, LLD

(57) ABSTRACT

The present invention provides a thermosetting high solids coating composition comprising (A) a carboxyl-containing compound, (B) a polyepoxide, and (C) a copolymer prepared by polymerizing monomer components comprising (a) 30 to 50% by weight of vinyltrimethoxysilane and/or vinyltriethoxysilane, (b) 5 to 15% by weight of N-methylol (meth)acrylamide alkyl ether, and (c) 35 to 65% by weight of another polymerizable unsaturated monomer, and a method for forming a topcoat using said composition. The composition of the present invention is highly effective in forming a coating film excellent in resistance to both acids and scratch, and is superior in storage stability and recoat adhesion.

16 Claims, No Drawings

THERMOSETTING, HIGH-SOLIDS COATING COMPOSITION AND METHOD OF FORMING TOPCOAT BY USING THE SAME

TECHNICAL FIELD

The present invention relates to a novel thermosetting, high solids coating composition and method of forming topcoat by using the same.

BACKGROUND ART

Thermosetting topcoat compositions comprising a hydroxyl-containing acrylic resin and a melamine resin have been heretofore chiefly used for coating automotive exterior panels. However, in recent years, acid rain has posed a worldwide problem of etching and blots or like stains on coating films. With the widespread use of car washers, scratches made on coating films by car washers have presented another problem. In this situation, there is a need for topcoat compositions, particularly clear coat compositions, which are capable of forming coating films satisfactory in both acid resistance and scratch resistance.

Usually, the scratch resistance of a coating film can be improved by increasing the crosslinking density of the film. The acid resistance of a coating film can be improved by incorporating an acid resistant crosslinking system into the film. However, a method has been scarcely proposed for giving both acid resistance and scratch resistance to a coating film.

For example, Japanese Unexamined Patent Publication No. 222,753/1990 discloses that a coating film having high crosslinking density, and thus having high scratch resistance, can be obtained by baking an acrylic resin of high hydroxyl value in the presence of a monomeric melamine resin and an acid catalyst. However, this crosslinking system has a drawback of poor acid resistance since the coating film crosslinked by a melamine resin readily decomposes when contacted with an acid.

Methods have been proposed for imparting both acid resistance and scratch resistance to a coating film by incorporating an acid-resistant crosslinking system to a less acid-resistant melamine resin crosslinking system. The proposed systems include, for example, a composite crosslinking system having a combination of carboxyl group/epoxy group/hydroxyl group/melamine resin (Japanese Unexamined Patent Publication No. 247,264/1990), a composite crosslinking system having a combination of hydroxyl group/alkoxysilyl group/melamine resin (WO91/16,383), etc. However, these systems have not satisfactorily achieved significant improvements in acid resistance because of the presence of a melamine resin.

Melamine resin-free crosslinking systems have also been proposed. The proposals include a crosslinking system having only a combination of carboxyl group/epoxy group or carboxyl group/epoxy group/hydroxyl group (e.g., Japanese Unexamined Patent Publications Nos. 87,288/1987, 45,577/1990 and 287,650/1991). Yet, these systems have a shortcoming that the resulting coating films, although superior in acid resistance, are inferior in scratch resistance owing to the low crosslinking density of the cured films.

A resin composition comprising a carboxyl-containing acrylic polymer and an epoxy- and hydrolyzable silyl-containing compound is known as a crosslinking system having a combination of carboxyl group/epoxy group/hydrolyzable silyl group (Japanese Unexamined Patent Publication No. 187,749/1987), but this composition has a defect that the curing reaction of the polymer with the compound is unsatisfactory because of the steric hindrance caused by the presence of the epoxy group and hydrolyzable silyl group in the same molecule.

A resin composition comprising a hydroxyl- and carboxyl-containing silicone polymer, a carboxyl- and carboxylic acid ester group-containing polymer and a hydroxyl- and epoxy-containing polymer has been proposed as a crosslinking system having a combination of carboxyl group/epoxy group/hydroxyl group which contains the silicone polymer as a base resin (Japanese Unexamined Patent Publication No. 166,741/1994). However, the cured coating of this composition is defective in that it is not always fully satisfactory in crosslinking density and is poor in the recoat adhesion which is one of the important characteristics of coating compositions for automotive exterior panels.

On the other hand, it is of urgent necessity in the field of coating compositions to take measures for the control on the use of organic solvents, from the viewpoints of prevention of air pollution and conservation of resources. As one of such measures, there is a demand for the development of high solids coating compositions which contain a less amount of solvents and have a higher solid concentration.

DISCLOSURE OF INVENTION

An object of the present invention is to provide a novel thermosetting high solids coating composition free of the foregoing prior art drawbacks, and a method of forming a topcoat using said composition.

Another object of the invention is to provide a novel thermosetting high solids coating composition which is capable of forming a coating film excellent in both acid resistance and scratch resistance, and a method for forming a topcoat using said composition.

A further object of the invention is to provide a novel thermosetting high solids coating composition excellent in storage stability and recoat adhesion, and a method for forming a topcoat using said composition.

Other objects and features of the invention will become apparent from the following description.

The present invention provides a thermosetting high solids coating composition comprising:

(A) a carboxyl-containing compound,
(B) a polyepoxide, and
(C) a copolymer prepared by polymerizing monomer components comprising (a) 30 to 50% by weight of vinyltrimethoxysilane and/or vinyltriethoxysilane, (b) 5 to 15% by weight of N-methylol(meth)acrylamide alkyl ether and (c) 35 to 65% by weight of another polymerizable unsaturated monomer.

Further, the present invention provides a method for forming a topcoat comprising the step of successively forming a colored base coat and a clear coat on a substrate, said colored base coat and/or clear coat being formed from the above coating composition.

The inventors of the present invention conducted extensive research to achieve the above objects and found that the foregoing objects can be achieved by a thermosetting high solids coating composition comprising a carboxyl-containing compound (A), a polyepoxide (B) and the above-specified copolymer (C). The present invention has been completed based on this novel finding.

The high solids coating composition and the method for forming a topcoat according to the invention will be described below in further details.

The high solids coating composition of the invention essentially comprises (A) the carboxyl-containing compound, (B) the polyepoxide and (C) the specific copolymer containing at least one hydrolyzable alkoxysilyl group selected from methoxysilyl and ethoxysilyl, and at least one alkyl-etherified N-methylol group.

The carboxyl-containing compound (A) for use in the invention contains a carboxyl group in its molecule and usually has an acid value of 50 to 500 mg KOH/g, preferably 80 to 300 mg KOH/g.

An acid value of less than 50 mg KOH/g of the compound (A) is likely to lower the curability of the resulting composition and to thereby reduce the acid resistance, scratch resistance and stain resistance of the coating film. On the other hand, an acid value of more than 500 mg KOH/g tends to decrease the compatibility with the polyepoxide (B) and the copolymer (C) and to thereby reduce the storage stability of the composition. Hence an acid value of the compound (A) outside said range is undesirable.

The following compounds (A-1) to (A-4) are usable as the compound (A).

(A-1): a polymer having, in its molecule, a group formed by half esterification of an acid anhydride group The group formed by half esterification of an acid anhydride group consists of a carboxyl group and a carboxylic acid ester group, and is obtained by subjecting an acid anhydride group and an aliphatic monohydric alcohol to addition reaction for ring opening, namely half esterification. Hereinafter the group may be referred to simply as "half ester group".

The compound (A-1) can be easily prepared by copolymerizing an unsaturated monomer having a half ester group and other polymerizable unsaturated monomers in the conventional manner, or by the same copolymerization with the exception of using an unsaturated monomer having an acid anhydride group in place of the unsaturated monomer having a half ester group, followed by half esterification of the acid anhydride group.

Useful unsaturated monomers having an acid anhydride group are, for example, a maleic anhydride, an itaconic anhydride or the like. Useful unsaturated monomers having a half ester group are, for example, those prepared by half esterification of the acid anhydride group in the unsaturated monomer.

The half esterification can be done either before or after the copolymerization reaction, as described above. Examples of aliphatic monohydric alcohols useful in the half esterification are low-molecular-weight monohydric alcohols such as methanol, ethanol, isopropanol, t-butanol, isobutanol, methyl cellosolve, ethyl cellosolve, etc. The half esterification reaction is conducted in the conventional manner at a temperature ranging from room temperature to about 80° C., if necessary in the presence of tertiary amine serving as a catalyst.

Examples of other polymerizable unsaturated monomers are hydroxyl-containing unsaturated monomers; (meth) acrylic acid esters; vinyl ethers and aryl ethers; olefin compounds and dlene compounds; hydrocarbon ring-containing unsaturated monomers; nitrogen-containing unsaturated monomers; acrylic monomers containing hydrolyzable alkoxysilyl group; etc.

Examples of the hydroxyl-containing unsaturated monomers are $C_{2-8}$ hydroxyalkyl esters of acrylic or methacrylic acids, such as 2-hydroxyethyl (meth)acrylate, 3-hydroxypropyl (meth)acrylate, hydroxybutyl (meth) acrylate, etc.; monoesters of (meth)acrylic acid or like unsaturated carboxylic acids with polyethylene glycol, polypropylene glycol, polybutylene glycol or like polyether polyols; monoethers of 2-hydroxyethyl (meth)acrylate or like hydroxyalkyl esters of (meth) acrylic acid with polyethylene glycol, polypropylene glycol, polybutylene glycol or like polyether polyols; monoesterification products or diesterification products of maleic anhydride, itaconic anhydride or like acid anhydride group-containing unsaturated compounds with ethylene glycol, 1,6-hexanediol, neopentyl glycol or like glycols; hydroxyethyl vinyl ether or like hydroxyalkyl vinyl ethers; allyl alcohols and the like; 2-hydroxypropyl (meth)acrylate; adducts of α,β-unsaturated carboxylic acid with "CARDULA E10" (product of Shell Petrochemical Co., Ltd., trade name), α-olefin epoxide or like monoepoxy compounds; and adducts of glycidyl (meth) acrylate with acetic acid, propionic acid, p-tert-butylbenzoic acid, aliphatic acid or like monobasic acids; adducts of the above hydroxyl-containing unsaturated monomers with lactones (e.g., ε-caprolactone, γ-valerolactone, etc.); and the like.

Examples of (meth)acrylic acid esters are $C_{1-24}$ alkyl esters or cycloalkyl esters of acrylic or ethacrylic acids, such as methyl acrylate, ethyl acrylate, ropyl acrylate, isopropyl acrylate, n-butyl acrylate, isobutyl acrylate, t-butyl acrylate, hexyl acrylate, 2-ethylhexyl acrylate, n-octyl acrylate, decyl acrylate, stearyl acrylate, lauryl acrylate, cyclohexyl acrylate, methyl methacrylate, ethyl methacrylate, n-propyl methacrylate, isopropyl methacrylate, n-butyl methacrylate, isobutyl methacrylate, t-butyl methacrylate, hexyl methacrylate, 2-ethylhexyl methacrylate, octyl methacrylate, decyl methacrylate, lauryl methacrylate, stearyl methacrylate, cyclohexyl methacrylate, etc.; $C_{2-18}$ alkoxyalkyl esters of acrylic or methacrylic acids, such as methoxybutyl acrylate, methoxybutyl methacrylate, methoxyethyl acrylate, methoxyethyl methacrylate, ethoxybutyl acrylate, ethoxybutyl methacrylate, etc.; and the like.

Examples of vinyl ethers and aryl ethers are ethyl vinyl ether, n-propyl vinyl ether, isopropyl vinyl ether, butyl vinyl ether, t-butyl vinyl ether, pentyl vinyl ether, hexyl vinyl ether, octyl vinyl ether and like chain-like alkyl vinyl ethers; cyclopentyl vinyl ether, cyclohexyl vinyl ether and like cycloalkyl vinyl ethers; phenyl vinyl ether, trivinyl ether and like aryl vinyl ethers; benzyl vinyl ether, phenethyl vinyl ether and like aralkyl vinyl ethers; allyl ethyl ether and like allyl ethers; etc.

Examples of olefin compounds and diene compounds are ethylene, propylene, butylene, vinyl chloride, butadiene, isoprene, chloroprene, etc.

Examples of hydrocarbon ring-containing unsaturated monomers are styrene, α-methylstyrene, phenyl (meth) acrylate, phenylethyl (meth)acrylate, phenylpropyl (meth) acrylate, benzyl (meth)acrylate, phenoxyethyl (meth) acrylate, cyclohexyl (meth)acrylate, 2-acryloyloxy- ethylhydrogen phthalate, 2-acryloyloxypropylhydrogen phthalate, 2-acryloyloxypropylhexahydrohydrogen phthalate, 2-acryloyloxypropyltetrahydrohydrogen phthalate, ester of p-t-butyl-benzoic acid with hydroxyethyl (meth)acrylate, dicyclopentenyl (meth)acrylate, etc.

Examples of nitrogen-containing unsaturated monomers are nitrogen-containing alkyl (meth)acrylates such as N,N-dimethylaminoethyl (meth)acrylate, N,N-diethylaminoethyl (meth)acrylate, N-t-butylaminoethyl (meth)acrylate, etc.; polymerizable amides such as acrylamide, methacrylamide, N-methyl (meth)acrylamide, N-ethyl (meth)acrylamide, N,N-dimethyl (meth)acrylamide, N,N-dimethylaminopropyl (meth)acrylamide, N,N-dimethylaminoethyl (meth)acrylamide, etc.; aromatic nitrogen-containing monomers such as 2-vinylpyridine, 1-vinyl-2-pyrrolidone, 4-vinylpyridine, etc.; polymerizable nitriles such as acrylonitrile, methacrylonitrile, etc.; allylamines; and so on.

Examples of the hydrolyzable alkoxysilyl-containing acrylic monomer are γ-(meth)acryloyloxypropyltrimethoxysilane, γ-(meth)acryloyloxypropylmethyldimethoxysilane, β-(meth)acryloyloxyethyltrimethoxysilane, γ-(meth)acryloyloxypropyltriethoxysilane, γ-(meth)acryloyloxypropylmethyldiethoxysilane and the like.

The copolymerization can be carried out by conventional methods for polymerization of unsaturated monomers. The most suitable method is solution type radical polymerization carried out in an organic solvent, in view of application range and costs. Stated more specifically, the desired polymer can be easily obtained by copolymerization at a temperature of about 60 to about 150° C. in an organic solvent in the presence of a polymerization initiator such as azo catalysts, peroxide catalysts or the like. Useful organic solvents include aromatic solvents such as xylene and toluene, ketone solvents such as methyl ethyl ketone and methyl isobutyl ketone, ester solvents such as ethyl acetate, butyl acetate, isobutyl acetate and 3-methoxybutyl acetate, and alcohols such as n-butanol and isopropyl alcohol, etc.

The half ester group- or acid anhydride group-containing unsaturated monomer and other polymerizable unsaturated monomer are copolymerized in the following proportions based on the total weight of the monomers. The proportion of the half ester group- or acid anhydride group-containing unsaturated monomer is about 5 to about 40% by weight, preferably about 10 to about 30% by weight, in view of curability and storage stability. The proportion of the other polymerizable unsaturated monomer is about 60 to about 95% by weight, preferably about 70 to about 90% by weight. Of the other polymerizable unsaturated monomers, styrene is used suitably in a proportion of up to about 20% by weight in view of weatherability of cured coating. When an acid anhydride group-containing unsaturated monomer is used, half esterification is carried out after copolymerization as described above.

The compound (A-1) is preferably an acrylic polymer having a number average molecular weight of 2,000 to 20,000. A number average molecular weight of less than 2,000 tends to impair the weatherability of the cured coating, whereas a number average molecular weight exceeding 20,000 tends to reduce the compatibility with the polyepoxide (B) and the copolymer (C). Hence a number average molecular weight of the compound (A-1) outside said range is undesirable.

(A-2): polymer having a carboxyl group in its molecule

The number average molecular weight of the compound (A-2) is preferably about 2,000 to about 20,000. A number average molecular weight of less than 2,000 tends to impair the weatherability of the cured coating, whereas a number average molecular weight exceeding 20,000 tends to reduce the compatibility with the polyepoxide (B) and the copolymer (C). Hence a number average molecular weight of the compound (A-2) outside said range is undesirable.

The compound (A-2) can be easily prepared by copolymerizing a carboxyl-containing unsaturated monomer and other polymerizable unsaturated monomers in the similar conventional manner for the above compound (A-1).

Examples of carboxyl-containing unsaturated monomers include acrylic acid, methacrylic acid, crotonic acid, itaconic acid, maleic acid, fumaric acid, 2-carboxyethyl (meth) acrylate, 2-carboxypropyl (meth)acrylate and 5-carboxypentyl (meth)acrylate.

Examples of other polymerizable unsaturated monomers include those used in the preparation of the compound (A-1) such as (meth)acrylic acid esters; vinyl ethers and aryl ethers; olefin compounds and diene compounds; hydrocarbon ring-containing unsaturated monomers and nitrogen-containing unsaturated monomers.

(A-3): carboxyl-containing polyester polymer

The number average molecular weight of the carboxyl-containing polyester polymer is not limited specifically, but preferably about 1,500 to about 20,000.

The carboxyl-containing polyester polymer can be easily prepared by condensation reaction of a polyhydric alcohol with a polycarboxylic acid. Useful polyhydric alcohols include, for example, ethylene glycol, butylene glycol, 1,6-hexanediol, trimethylolpropane, pentaerythritol, etc. Useful polycarboxylic acids include, for example, adipic acid, terephthalic acid, isophthalic acid, phthalic anhydride, hexahydrophthalic anhydride, etc. Stated more specifically, the carboxyl-containing polyester polymer can be prepared, for example, by a one-step reaction using a reaction system containing excess carboxyl group of a polycarboxylic acid, or by a reaction using a reaction system containing excess hydroxyl group of a polyhydric alcohol to give a hydroxyl-terminated polyester polymer, followed by an addition reaction of the polymer with an acid anhydride group-containing compound such as phthalic anhydride, hexahydrophthalic anhydride, succinic anhydride, etc.

(A-4): A half ester formed by a reaction of polyol with 1,2-acid anhydride

The number average molecular weight of said half ester is not limited specifically, but usually as low as about 400 to about 1,000. Said half ester is highly reactive with an epoxy group and useful for forming a high solids coating composition.

Said half ester is obtained by reacting a polyol with 1,2-acid anhydride under conditions which can effect the ring-opening reaction of the acid anhydride but substantially do not cause polyesterification reaction. The product of such reaction has a low molecular weight and narrow molecular weight distribution. Further, the product has a low volatile organic content when contained in a composition and imparts excellent acid resistance and other properties to the resulting coating film.

The half ester is prepared by the reaction of a polyol with 1,2-acid anhydride in an inert atmosphere, such as nitrogen atmosphere, in the presence of a solvent. Preferred solvent are ketones such as methyl amyl ketone, diisobutyl ketone, methyl isobutyl ketone and the like; aromatic hydrocarbons such as toluene, xylene and the like; and other organic solvents such as dimethylformamide, N-methylpyrrolidone and the like.

The reaction is carried out preferably at a low temperature of about 150° C. or less. Specifically stated, the reaction temperature is preferably about 70 to about 150° C., more preferably about 90 to about 120° C. A temperature exceeding 150° C. causes polyesterification reaction, whereas a temperature less than 70° C. results in unsatisfactory reaction rate. Hence, reaction temperatures outside the specified range are not desirable.

Basically, the reaction time slightly varies depending on the reaction temperature, but is usually about 10 minutes to about 24 hours.

For obtaining the desired half ester in the maximum yield, the equivalent ratio of the acid anhydride to the polyol is about 0.8:1 to about 1.2:1, when calculating the acid anhydride as monofunctional compound.

The acid anhydride for use in the preparation of the desired half ester has about 2 to about 30 carbon atoms excluding the carbon atoms in the acid moiety. Examples of such acid anhydrides are aliphatic acid anhydrides, alicyclic acid anhydrides, olefin acid anhydrides and cyclic olefin acid anhydrides and aromatic acid anhydrides. These acid anhydrides may have substituents insofar as the substituents do not adversely affect the reactivity of the acid anhydride or the properties of the resulting half ester. Examples of the substituents are chloro, alkyl and alkoxy groups. Examples of the acid anhydrides are succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, hexahydrophthalic anhydride, alkylhexahydrophthalic anhydride (such as methylhexahydrophthalic anhydride), tetrafluorophthalic anhydride, endomethylenetetrahydrophthalic anhydride, chlorendic anhydride, itaconic anhydride, citraconic anhydride and maleic anhydride.

Usable polyols are those having about 2 to about 20 carbon atoms. Preferably usable are diols, triols, mixtures thereof, and like polyols having 2 to 10 carbon atoms. Preferable examples are aliphatic polyols such as ethylene glycol, 1,2-propanediol, 1,3-propanediol, 1,4-butanediol, 1,5-pentanediol, glycerol, 1,2,3-butane triol, 1,6-hexanediol, neopentyl glycol, diethylene glycol, dipropylene glycol, 1,4-cyclohexane dimethanol, 3-methyl-1,5-pentanediol, trimethylolpropane, 2,2,4-trimethyl-pentane-1,3-diol, pentaerythritol and 1,2,3,4-butanetetraol. Aromatic polyols such as bisphenol A and bis (hydroxymethyl)xylene are also usable.

The polyepoxide (B) for use in the composition of the present invention is a compound having an epoxy group in its molecule. The polyepoxide usually contains 0.8 to 15 mmol/g, preferably 1.2 to 10 mmol/g of the epoxy group.

An epoxy content of less than 0.8 mmol/g of the polyepoxide (B) is likely to lower the curability of the resulting composition and to thereby reduce the acid resistance, scratch resistance and stain resistance of the coating film, whereas an epoxy content of higher than 15 mmol/g tends to decrease the compatibility with the carboxyl-containing compound (A) and the copolymer (C) and to thereby reduce the storage stability of the composition. Hence, an epoxy content of the polyepoxide (B) outside said range is undesirable.

Examples of the polyepoxide (B) include epoxy-containing acrylic polymers; alicyclic epoxy-containing acrylic polymers; diglycidyl ether, 2-glycidylphenyl glycidyl ether, 2,6-diglycidylphenyl glycidyl ether and like glycidyl ether compounds; vinylcyclohexene dioxide, limonene dioxide and like glycidyl- or alicyclic epoxy-containing compounds; dicyclopentadiene dioxide, bis(2,3-epoxycyclopentyl)ether, epoxycyclohexenecarboxylic acid ethylene glycol diester, bls(3,4-epoxycyclohexyl methyl) adipate, 3,4-epoxycyclohexylmethyl-3,4-epoxycyclohexanecarboxylate, 3,4-epoxy-6-methylcyclohexylmethyl-3,4-epoxy-6-methylcyclohexane carboxylate and like alicyclic epoxy-containing compounds. These polyepoxides may be used in combination.

Among these polyepoxides, preferably used are the epoxy-containing acrylic polymers and alicyclic epoxy-containing acrylic polymers having a number average molecular weight of 2,000 to 20,000. A number average molecular weight of less than 2,000 is likely to lower the weatherability of the cured coating film, whereas a number average molecular weight of more than 20,000 tends to decrease the compatibility with the compound (A) and the copolymer (C). Hence, a number average molecular weight outside said range is undesirable.

Said epoxy-containing acrylic polymer or alicyclic epoxy-containing acrylic polymer is easily prepared by copolymerizing an epoxy-containing unsaturated monomer or alicyclic epoxy-containing unsaturated monomer with other polymerizable unsaturated monomer in the same conventional manner for the aforementioned compound (A-1).

Examples of the epoxy-containing unsaturated monomer are glycidyl (meth)acrylate, allyl glycidyl ether and the like. Examples of the alicyclic epoxy-containing unsaturated monomer are 3,4-epoxycyclohexylmethyl (meth)acrylate and the like.

Examples of other polymerizable unsaturated monomers are those mentioned as the polymerizable unsaturated monomers for the above-mentioned compound (A-1), i.e., hydroxyl-containing unsaturated monomers; (meth)acrylic acid esters; vinyl ethers and aryl ethers; olefin compounds and diene compounds; hydrocarbon ring-containing unsaturated monomers; and nitrogen-containing unsaturated monomers; acrylic monomers containing hydrolyzable alkoxysilyl group; etc.

The copolymer (C) for use in the composition of the present invention is a copolymer prepared by polymerizing 100% by weight of a monomer component consisting of (a) 30 to 50% by weight of vinyltrimethoxysilane and/or vinyltriethoxysilane, (b) 5 to 15% by weight of N-methylol (meth)acrylamide alkyl ether and (c) 35 to 65% by weight of another polymerizable unsaturated monomer. When the proportion of the monomer (a) is lower than 30% by weight, the composition using the resulting copolymer has lower curability and reduced scratch resistance of the coating film. On the other hand, when the proportion of the monomer (a) is higher than 50% by weight, the composition tends to lower recoat adhesion. In addition, when the proportion of the monomer (b) is lower than 5% by weight, the recoat adhesion of the composition is lowered, while the coating film is likely to cause yellowing when the proportion is higher than 15% by weight.

Said copolymer (C) usually has the content of hydrolyzable alkoxysilyl group, i.e., methoxysilyl group and/or ethoxysilyl group, of 0.5 to 4.0 mmol/g, preferably 1.0 to 3.5 mmol/g, and a number average molecular weight of 1,000 to 5,000, preferably 1,200 to 4,000. The content of the above hydrolyzable alkoxysilyl group of less than 0.5 mmol/g is likely to lower the curability of the resulting coating composition and reduce the acid resistance and scratch resistance of the resulting coating film, whereas the content of the hydrolyzable alkoxysilyl group of more than 4.0 mmol/g tends to decrease the compatibility with the compound (A) and the polyepoxide (B). Hence, the content of the hydrolyzable alkoxysilyl group outside said range is undesirable. When the copolymer (C) has a number average molecular weight of less than 1,000, the curability of the coating composition is lowered and the acid resistance of the resulting coating film is degraded. On the other hand, when the copolymer (C) has a number average molecular weight of more than 5,000, the compatibility with the compound (A) and the polyepoxide (B) is lowered and it becomes difficult to obtain the high solids coating composition. Thus, the number average molecular weight outside said range is undesirable.

Said copolymer (C) can be readily prepared by copolymerizing the above monomer component consisting of the monomers (a), (b) and (c) by the same conventional procedure for preparing the compound (A-1).

The monomer (a) is vinyltrimethoxysilane, vinyltriethoxysilane or a mixture of vinyltrimethoxysilane and vinyltriethoxysilane in any proportion.

The monomer (b) is a N-methylol(meth)acrylamide alkyl ether, of which alkyl moiety preferably has 1 to 4 carbon atoms. Particularly preferred are N-methylolacrylamide butyl ether, N-methylolacrylamide methyl ether, etc.

Examples of other polymerizable unsaturated monomers, that is, the monomer (c), are those mentioned as other polymerizable unsaturated monomers for the above compound (A-1), namely, (meth)acrylic acid esters; hydroxyl-containing unsaturated monomers; vinyl ethers and aryl ethers; olefin compounds and diene compounds; hydrocarbon ring-containing unsaturated monomers; and nitrogen-containing unsaturated monomers; hydrolyzable alkoxysilyl-containing acrylic monomers; etc.

In copolymerization for preparing the copolymer (C) of the invention, it is preferable to use a $C_{1-24}$ alkyl ester or cycloalkyl ester of acrylic or methacrylic acid as the polymerizable unsaturated monomer (c). It is more preferable to copolymerize a $C_{1-4}$ alkyl ester of acrylic or methacrylic acid as the monomer (c).

The thermosetting high solids coating composition of the invention contains, as essential components, the carboxyl-containing compound (A), the polyepoxide (B) and the copolymer (C) containing a specific hydrolyzable alkoxysilyl group, preferably in the following proportions. The proportion of the compound (A) and the polyepoxide (B) is preferably such that the equivalent ratio of the carboxyl group in the compound (A) to the epoxy group in the polyepoxide (B) is 1:0.5 to 0.5:1, the proportion of the copolymer (C) is preferably 3 to 200 parts by weight per 100 parts by weight of the combined amount of the compound (A) and the polyepoxide (B). Proportions outside said range tend to reduce the curability and thereby lower the acid resistance and scratch resistance of the coating film, and thus are not preferable. More preferably, the proportions of the compound (A) and the polyepoxide (B) are such that the equivalent ratio of the carboxyl group in the former to the epoxy group in the latter is 1:0.7 to 0.7 to 1, and the proportion of the copolymer (C) is 9 to 100 parts by weight per 100 parts by weight of the combined amount of the compound (A) and the polyepoxide (B).

The coating composition of the present invention may contain curing catalysts when necessary.

Usable curing catalysts include those which are effective for the ring-opening esterification of the carboxyl group in the compound (A) with the epoxy group in the epoxide (B), such as tetraethylammonium bromide, tetrabutylammonium bromide, tetraethylammonium chloride, tetrabutylphosphonium bromide, triphenylbenzylphosphonium chloride and like quaternary salt catalysts; triethylamine, tributylamine and like amines; etc. Among them, quaternary salt catalysts are preferable. Catalysts consisting of said quaternary salt and an acidic phosphoric acid compound (e.g., dibutylphosphoric acid, etc.) in equivalent amount are also preferable, since such catalysts improve the storage stability of the coating composition and prevent the lowering of the spray coating amenability owing to the reduction of the electric resistance of the coating composition, without impairing the above-mentioned catalytic action.

Also usable are curing catalysts effective for the hydrolytic condensation of the methoxysilyl or ethoxysilyl group in the copolymer (C). Examples of such catalysts include acids, for example, sulfuric acid, phosphoric acid and like inorganic acid, p-toluenesulfonic acid, dodecylbenzene-sulfonic acid, dinonylnaphthalene-sulfonic acid, dinonyl-naphthalenedisulfonic acid, trichloracetic acid, trifluoromethanesulfonic acid and like organic acids; monoethanolamine, diethanolamine, triethylamine, tributylamine, 2-aminomethylpropanol and like amine compounds; neutralized products of said acids and said amine compounds; dibutyltin dilaurate, dibutyltin diacetate and like tin catalysts; tetrabutyl titanate and like titanium catalysts; etc.

When the above curing catalyst is used, the proportion is usually about 0.01 to about 5 parts by weight per 100 parts by weight of the combined amount of the carboxyl-containing compound (A), polyepoxide (B) and hydrolyzable alkoxysilyl-containing copolymer (C), calculated as solids.

When necessary, the composition of the invention may contain dehydrating agents such as trimethyl orthoacetate for preventing the coating composition from degradation caused by moisture in the air or the solvent.

Further, generally known pigments such as coloring pigments, extender pigments, anti-corrosive pigments and the like can be added to the coating composition of the present invention, when necessary.

Examples of useful coloring pigments are organic pigments such as quinacridone red and like quinacridone pigments, pigment red and like azo pigments, phthalocyanine blue, phthalocyanine green, perylene red and like phthalocyanine pigments; inorganic pigments such as titanium oxide and carbon black; metallic pigments such as aluminum flake, nickel flake, copper flake, brass flake, chrome flake, pearl mica and colored pearl mica.

The composition of the invention may optionally contain resins such as polyester resins, alkyd resins, silicone resins, fluorine resins, and nonaqueous particulate polymer etc., and may also contain a minor amount of melamine resins, blocked isocyanate or like crosslinking agents. Further, the composition of the invention may contain conventional additives for coating compositions such as UV absorbers, oxidation inhibitors, surface modifiers, defoaming agents, etc.

The thermosetting coating composition of the invention is usually used in the form of an organic solvent type coating composition. Examples of useful organic solvents include those for coating compositions such as aromatic or aliphatic hydrocarbon solvents; alcohol solvents; ester solvents; ketone solvents; ether solvents, etc. Organic solvents used in preparing the components of the composition can be used as it is, or additional organic solvents may be used.

The coating composition of the present invention may be prepared as a high solids composition. The solid concentration of said composition is usually as high as about 40 to about 80% by weight, preferably about 45 to about 75% by weight.

The thermosetting coating composition of the invention can be applied to various substrates by conventional coating methods and can be fully cured by heating at a temperature of about 100 to about 180° C. for about 10 to about 60 minutes to give a coating film having high acid resistance, scratch resistance and stain resistance. It is presumed that the composition of the present invention is fully cured by crosslinking based on the ring-opening esterification reaction of the carboxyl group in the compound (A) and the epoxy group in the epoxide (B), as well as on the hydrolytic self-condensation reaction of methoxysilyl group and/or ethoxysilyl group in the copolymer (C).

The method for forming a topcoat according to the present invention comprises the step of successively forming a colored base coat and clear coat on a substrate, said colored base coat and/or clear coat being formed from the thermosetting coating composition of the invention.

The substrates to be used for forming the topcoat include steel panels treated by chemical conversion, electrophoretically coated with a primer, and optionally coated with an intercoat; various plastic substrates optionally surface-treated and optionally coated either with a primer or with a primer and an intercoat; substrates produced by a composite of the steel and plastics, etc.

In the method of forming a topcoat according to the invention, the thermosetting coating composition of the invention is used as at least one of the composition for forming the colored base coat and the composition for forming the clear coat.

The thermosetting coating composition of the invention is capable of forming a coating film excellent especially in resistance to acids and scratch and is, therefore, preferably used as a resin component of a coating composition for forming a clear coat.

The thermosetting coating composition of the invention as such can be used as a clear coat composition. The clear coat composition may contain coloring pigments in an amount which will not completely hide the colored base coat.

The thermosetting coating composition of the invention can be used as a colored base coat composition by properly incorporating therein the organic pigments, inorganic pigments, metallic pigments and like coloring pigments mentioned above.

The method of forming a topcoat according to the invention is particularly suitable for forming a topcoat on automotive exterior panels. The coating methods of the invention include those known in the automotive industry, for example, those comprising forming a colored base coat and a clear coat by 2-coat 1-bake system or 2-coat 2-bake system, and those comprising forming a colored base coat, a clear coat and a clear coat by 3-coat 1-bake system or 3-coat 2-bake system.

The most desirable method of forming a topcoat according to the invention comprises the steps of applying a composition for forming a colored base coat to a substrate, applying a composition for forming a clear coat to the uncured surface of the base coat, and curing the two coats by heating according to 2-coat 1-bake system.

Described below is the coating method by 2-coat 1-bake system using the thermosetting coating composition of the invention as the resin component of a clear coat composition.

In 2-coat 1-bake system, a colored base coat composition is first applied to the above-mentioned substrate by conventional coating methods such as spray coating or the like.

The colored base coat composition may be the thermosetting coating composition of the invention, or may be of the type per se known and conventionally used in a method for forming a topcoat.

Examples of colored base coat compositions per se known include, for example, those comprising a curable resin component and said coloring pigment. Useful curable resin components are, for example, acrylic resin/amino resin mixture, alkyd resin/amino resin mixture, polyester resin/amino resin mixture, acrylic resin/polyisocyanate mixture, alkyd resin/polyisocyanate mixture, polyester resin/polyisocyanate mixture, etc. The amino resins used in said mixtures include melamine resins. The form of these known colored base coat compositions is not specifically limited and can be a desirable type selected from organic solvent type, nonaqueous dispersion type, aqueous dispersion type, aqueous solution type, high solids type, etc.

Application devices for spray coating include those conventionally used, such as an air spray gun, airless spray gun, air spray type electrostatic coater, airless spray type electrostatic coater, rotary atomization type electrostatic coater, etc.

The colored base coat composition is applied preferably to a thickness of about 10 to about 30 $\mu$m (when cured). The colored base coat thus deposited is left to stand at room temperature for a few minutes or is force-dried at a temperature of about 50 to about 80° C. for a few minutes and then the thermosetting coating composition of the invention is applied as a clear coat composition.

The clear coat composition can be applied by the same manner using the same application device as in the application of the colored base coat composition.

The clear coat composition is applied preferably to a thickness of about 20 to about 80 $\mu$m (when cured).

Both the colored base coat and the clear coat thus applied are concurrently cured by heating at about 100 to about 180° C. for about 10 to about 60 minutes.

In the method for forming a topcoat according to the present invention, the composition for forming the colored base coat is preferably an aqueous type, or an organic solvent type having a solid concentration of about 35 to about 65% by weight (when applied by spray coating). The composition for forming the clear coat is preferably of an organic solvent type having a solid concentration of about 45 to about 75% by weight (when applied by spray coating).

The articles coated by the coating method of the invention have a coating film excellent in resistance to acids and scratch, and the coating film thus formed is particularly suitable for covering automotive exterior panels.

BEST MODE FOR CARRYING OUT THE INVENTION

The present invention is described below in more detail with reference to Examples wherein the parts and percentages are all by weight.

PREPARATION EXAMPLE 1

Preparation of acrylic polymer (a-1) having carboxyl group

A 5-liter glass flask equipped with a stirrer, thermometer and condenser was charged with 553 parts of xylene and 276 parts of 3-methoxybutyl acetate. The mixture was heated to 125° C. by an electrothermic mantle. At the same temperature, a mixture of the following monomer components was added dropwise at a uniform rate over a period of 4 hours. p-Tert-butylperoxy-2-ethyl hexanoate is a polymerization initiator.

| | |
|---|---|
| n-Butyl methacrylate | 432 parts |
| Isobutyl methacrylate | 346 parts |
| Lauryl methacrylate | 360 parts |
| Styrene | 72 parts |
| Methacrylic acid | 86 parts |
| Acrylic acid | 144 parts |
| p-Tert-butylperoxy-2-ethylhexanoate | 72 parts |

The mixture was aged for 30 minutes. Added dropwise was a mixture of 277 parts of 3-methoxybutyl acetate and 14.4 parts of p-tert-butylperoxy-2-ethyl hexanoate over a period of 2 hours. The mixture was aged for 2 hours, giving a solution of a carboxyl-containing acrylic polymer (a-1) of a final conversion of 100%.

The obtained polymer solution had a polymer solid content of 70% and a Gardner viscosity (25° C.) of V. The polymer had a number average molecular weight of 3,000 and an acid value of 117 mg KOH/g.

PREPARATION EXAMPLE 2

Preparation of half ester (a-2) formed by addition reaction of polyol with 1,2-acid anhydride A 5-liter glass flask equipped with a stirrer, thermometer and condenser was charged with 236 parts of 3-methyl-1, 5-pentanediol, 134 parts of trimethylolpropane, 1078 parts of hexahydrophthalic anhydride and 780 parts of xylene. The mixture was heated to 120° C. in a nitrogen atmosphere to initiate a reaction. The reaction mixture was maintained at the same temperature for 4 hours and then cooled, giving a solution of a half ester (a-2) having a solid content of 65% and a Gardner viscosity (25° C.) of R. The half ester had an acid value of 271 mg KOH/g.

PREPARATION EXAMPLE 3
Preparation of acrylic polymer (b-1) having epoxy group A 5-liter glass flask equipped with a stirrer, thermometer and condenser was charged with 410 parts of xylene and 77 parts of n-butanol. The mixture was heated to 125° C. by an electrothermic mantle. At the same temperature, a mixture of the following monomer components was added dropwise at a uniform rate over a period of 4 hours. Azobisisobutyronitrile is a polymerization initiator.

| | |
|---|---|
| Glycidyl methacrylate | 432 parts |
| 2-Hydroxyethyl acrylate | 216 parts |
| n-Butyl acrylate | 504 parts |
| Styrene | 288 parts |
| Azobisisobutyronitrile | 72 parts |

The mixture was aged for 30 minutes. Added dropwise was a mixture of 90 parts of xylene, 40 parts of n-butanol and 14.4 parts of azobisisobutyronitrile over a period of 2 hours. The mixture was aged for 2 hours, giving a solution of an epoxy-containing acrylic polymer (b-1).

The obtained polymer solution had a polymer solid content of 70% and a Gardner viscosity (25° C.) of W. The polymer had a number average molecular weight of 3,000 and an epoxy content of 2.11 mmol/g.

PREPARATION EXAMPLE 4
Alicyclic epoxy-containing acrylic polymer (b-2)

A solution of alicyclic epoxy-containing acrylic polymer (b-2) was prepared in the same manner as in Preparation Example 3 with the exception of changing only the monomer composition as follows.

| | |
|---|---|
| 3,4-Epoxycyclohexylmethyl methacrylate | 576 parts |
| 2-Hydroxyethyl methacrylate | 216 parts |
| Styrene | 288 parts |
| n-Butyl acrylate | 360 parts |

The obtained polymer solution had a polymer solid content of 70% and a Gardner viscosity (25° C.) of Y.

The polymer had a number average molecular weight of 3,000 and an epoxy content of 2.04 mmol/g.

PREPARATION EXAMPLE 5
Preparation of copolymer (c-1) having methoxysilyl group and alkyl-etherified N-methylol group A 5-liter glass flask equipped with a stirrer, thermometer and condenser was charged with 300 parts of xylene, 500 parts of butyl acetate and 200 parts of n-butanol. The mixture was heated to 120° C. by an electrothermic mantle. At the same temperature, a mixture of the following monomer components was added dropwise at a uniform rate over a period of 4 hours.

| | |
|---|---|
| Vinyltrimethoxysilane | 400 parts |
| Ethyl acrylate | 500 parts |
| N-methylolacrylamide butyl ether | 100 parts |
| t-Butylperoxyisopropyl carbonate | 20 parts |

The mixture was aged for 30 minutes. Added dropwise was 10 parts of t-butylperoxyisopropyl carbonate over a period of 2 hours, followed by aging for 1 hour. The solvent was removed under reduced pressure to concentrate the solution until the resin solid concentration increased to 70%, thus giving a solution of a copolymer (c-1). The solution had a Gardner viscosity of A (at 25° C.). The obtained copolymer (c-1) had a number average molecular weight of 1,500 and methoxysilyl group content of 2.7 mmol/g.

PREPARATION EXAMPLE 6
Preparation of organic solvent type metallic base coat composition (Y-1)

(1) Preparation of hydroxyl-containing acrylic resin

In a mixed solvent of xylene/n-butanol (70/30 by weight) was polymerized a mixture of 30 parts of methyl methacrylate, 59 parts of ethyl acrylate, 10 parts of 2-hydroxyethyl acrylate and 1 part of acrylic acid at 100° C., using azobisisobutyronitrile as a polymerization initiator. A solution of hydroxyl-containing acrylic resin having a resin solid content of 50% was obtained. The resin had a number average molecular weight of 25,000.

(2) Preparation of the coating composition (Y-1)

| | |
|---|---|
| 50% solution of hydroxyl-containing acrylic resin obtained above | 110 parts |
| 88% "CYMEL 370" | 28 parts |
| 20% solution of CAB | 100 parts |
| Aluminum paste | 20 parts |

A mixture of the above components was adjusted to a viscosity of 13 seconds (Fordcup #4/20° C.) with a solvent mixture consisting of 30 parts of toluene, 20 parts of isobutyl alcohol, 30 parts of cellosolve acetate and 20 parts of "SWASOL 1000" (product of Cosmo Oil Co., Ltd., trade name, hydrocarbon solvent), giving an organic solvent type coating composition (Y-1) having a nonvolatile content of about 40%.

The above-mentioned 88% ° "CYMEL 370" (trade name, product of Mitsui-Cyanamid, Ltd.) is a partially methyl-etherified melamine resin having a resin solid content of 88% in isopropanol. The 20% solution of CAB is a 20% solution of cellulose acetate butylate in a mixed solvent of toluene/n-butyl acetate (50/50 by weight). The aluminum paste was "Aluminum Paste #55-519" (product of Toyo Aluminum Co., Ltd., trade name, metallic pigment).

PREPARATION EXAMPLE 7
Preparation of an aqueous metallic base coat composition (M-1)

(1) Preparation of an aqueous dispersion of acrylic resin (W-1)

A reactor was charged with 140 parts of deionized water, 2.5 parts of 30% "NEWCOL 707SF" (trade name, product of Nihon Nyukazai Co., Ltd., surfactant) and 1 part of the monomer mixture (i) shown below. The mixture was stirred in a nitrogen stream. At 60° C., a monomer emulsion consisting of 4 parts of 3% ammonium persulfate and 42 parts of deionized water was placed dropwise into the reactor over a period of 4 hours using a metering pump. After the addition, the mixture was aged for 1 hour.

Monomer mixture (i)

| | |
|---|---|
| Methyl methacrylate | 55 parts |
| Styrene | 10 parts |
| n-Butyl acrylate | 9 parts |
| 2-Hydroxyethyl acrylate | 5 parts |
| Methacrylic acid | 1 part |

Then, 20.5 parts of the monomer mixture (ii) shown below and 4 parts of 3% ammonium persulfate were concurrently placed dropwise into the reactor at 80° C. over a period of 1.5 hours. After the addition, the mixture was aged for 1 hour and filtered at 30° C. through a 200-mesh nylon cloth filter. Deionized water was added, and the mixture was adjusted to pH 7.5 with dimethylamino-ethanol, giving an aqueous dispersion of an acrylic resin (W-1) having an average particle diameter of 0.1 $\mu$m, a glass transition temperature (Tg) of 46° C. and a nonvolatile content of 20%.

Monomer mixture (ii)

| | |
|---|---|
| Methyl methacrylate | 5 parts |
| n-Butyl acrylate | 7 parts |
| 2-Ethylhexyl acrylate | 5 parts |
| Methacrylic acid | 3 parts |
| 30% "Newcol 707SF" | 0.5 part |

(2) Preparation of an aqueous solution of acrylic resin (W-2)

A reactor was charged with 60 parts of butyl cellosolve and 15 parts of isobutyl alcohol. The mixture was heated to 115° C. in a nitrogen stream. At a temperature of 115° C., there was added a mixture of 26 parts of n-butyl acrylate, 47 parts of methyl methacrylate, 10 parts of styrene, 10 parts of 2-hydroxyethyl methacrylate, 6 parts of acrylic acid and 1 part of azobisisobutyronitrile over a period of 3 hours. After the addition, the mixture was aged at 115° C. for 30 minutes. A mixture of 1 part of azobisisobutyronitrile and 115 parts of butyl cellosolve was added dropwise over a period of 1 hour, followed by aging for 30 minutes. The mixture was filtered at 50° C. through a 200-mesh nylon cloth filter. The obtained reaction product had an acid value of 48 mg KOH/g, a viscosity (Gardner bubble viscometer) of Z4, a nonvolatile content of 55% and a Tg of 45° C. The product was subjected to equivalent neutralization using dimethylaminoethanol. Then deionized water was added, giving an aqueous solution of an acrylic resin (W-2) having a nonvolatile content of 50%.

(3) Preparation of an aqueous metallic base coat composition (M-1)

| | |
|---|---|
| Aqueous dispersion of acrylic resin (W-1) | 275 parts |
| Aqueous solution of acrylic resin (W-2) | 40 parts |
| "CYMEL 350" (trade name, product of Mitsui Toatsu Chemicals Inc., fully methyl-etherified melamine resin) | 25 parts |
| "ALUMINUM PASTE AW-500B" (trade name, product of Asahi Chemical Metals Co., Ltd., metallic pigment) | 20 parts |
| Butyl cellosolve | 20 parts |
| Deionized water | 253 parts |

"THIXOL K-130B" (trade name, product of Kyoeisha Yushi Kagaku Kogyo KK, thickener) was added to the mixture of the above components to adjust the mixture to a viscosity of 3,000 cps as measured with a Brookfield viscometer (rotor revolution speed 6 rpm), giving an aqueous metallic coating composition (M-1) having a nonvolatile content of about 19%.

EXAMPLES 1–5 AND COMPARATIVE EXAMPLES 1–3

A solution of mixed resins having the composition (part by weight on solid basis) shown in Table 1 was prepared. Added thereto were 1 part of "TINUVIN 900" (trade name, product of Ciba-Geigy, ultraviolet absorber) and 0.1 part of "BYK-300" (trade name, product of BYK-Chemie Co., surface modifier). The mixture was diluted with "SWASOL 1000" (trade name, product of Cosmo Oil Co., Ltd., hydrocarbon solvent) for adjustment to a viscosity of 30 seconds (Ford cup #4/20° C.), whereby the coating composition of the present invention or a comparative coating composition was prepared. Table 1 also shows the solid content (%) of the obtained coating compositions (when applied).

The compositions thus obtained were tested for storage stability by the following method.

Storage stability: Each composition was diluted with "SWASOL 1000" to a viscosity of 30 seconds (Ford cup #4/20° C.). A 300 g portion of the diluted composition was placed into a beaker which was then loosely covered with aluminum foil. The composition was stored at 40° C. for 2 weeks, and its viscosity (Ford cup #4/20° C.) was measured to check the degree of thickening. The composition was evaluated by the following criteria:

A: viscosity less than 50 seconds (good storage stability), B: viscosity less than 70 seconds (slightly lower storage stability), and C: viscosity more than 70 seconds (poor storage stability).

The test results are shown in Table 1.

TABLE 1

| | Example | | | | | Comparative Example | | |
|---|---|---|---|---|---|---|---|---|
| Component | 1 | 2 | 3 | 4 | 5 | 1 | 2 | 3 |
| Compound (A) | | | | | | | | |
| a-1 | 40 | | 40 | | | 50 | | |
| a-2 | | 24 | | 24 | 21 | | 30 | 30 |
| Polyepoxide (B) | | | | | | | | |
| b-1 | 40 | 56 | | | 49 | 50 | 70 | |
| b-2 | | | 40 | 56 | | | | 70 |
| Copolymer (C) | | | | | | | | |
| c-1 | 20 | 20 | 20 | 20 | 30 | | | |
| Curing catalyst | | | | | | | | |
| TBAB | 0.5 | 0.5 | 0.5 | 0.5 | 0.5 | 0.5 | 0.5 | 0.5 |
| "Nacure 4054" | 0.5 | 0.5 | 0.5 | 0.5 | 0.5 | 0.5 | 0.5 | 0.5 |
| Solid content (%) | 53 | 58 | 52 | 56 | 62 | 38 | 45 | 40 |
| Storage stability | A | A | A | A | A | A | A | A |

In Table 1, TBAB, which is used as a curing catalyst, is tetrabutylammonium bromide (product of Nippon Fine Chemical Co., Ltd.). "Nacure 4054" (product of King Industries, Inc., trade name) is a 50% solution of acidic phosphoric acid ester.

EXAMPLES 6–10 AND COMPARATIVE EXAMPLES 4–8

Topcoats were formed by the following method according to 2-coat 1-bake system using the coating compositions obtained in Examples 1 to 5 and Comparative Examples 1 to 3 as clear coat compositions.

A dull steel panel of 0.8 mm thickness treated by chemical conversion with zinc phosphate was coated with an epoxy-based cationic electrodepositable coating composition to give a coating film of about 20 $\mu$m thickness (when dried). The coated panel was baked at 170° C. for 20 minutes, polished with sand paper (#400), and degreased by wiping with petroleum benzine. The coated panel was further coated by air spray coating with an automotive intercoating surfacer to give a coating film of about 25 $\mu$m thickness (when dried). The coated panel was baked at 140° C. for 30 minutes, subjected to wet rubbing with sand paper (#400), dehydrated for drying, and degreased by wiping with petroleum benzine, giving a test substrate.

The metallic base coat compositions obtained in Preparation Examples 6 and 7 were applied to the test substrate to a thickness of 20 $\mu$m (when cured). The substrates coated with the coating composition (Y-1) were left to stand at room temperature for 5 minutes, whereas those coated with the coating composition (M-1) were force-dried at 80° C. for 10 minutes. Each clear coat composition prepared above was applied to the coated test substrate to give a coating film of 40 $\mu$m thickness (when cured). The coated panel was heated at 140° C. for 30 minutes, whereby the two coats were cured to form a topcoat.

The topcoats thus formed were tested for properties as follows.

Film appearance

The metallic effect (brilliancy, whiteness and the like) was visually evaluated on A to C scale: A: excellent in metallic effect, B: poor in metallic effect, and C: exceedingly poor in metallic effect.

Acid resistance

A half area of the coated panel was immersed in a 40% solution of sulfuric acid. Then, the coated panel was left to stand at 50° C. for 5 hours, followed by washing with water. The surface of coated panel was visually inspected and rated on A to C scale:

A: no change, B: substantially no change in the coating surface but a slight difference in film thickness between the immersed portion and unimmersed portion, and C: blushing on the coating surface.

Scratch resistance

An automobile with the coated panel attached to the roof was washed 15 times in a car washer and the surface of coated panel was visually inspected. The car washer was a product of Yasui Sangyo Co., Ltd. available under the trade name "PO 20F WRC". The results were evaluated on A to C scale: A: substantially no scratch mark was found, B: slight scratch marks were found but to a negligible extent, and C: noticeable scratch marks were found.

Impact resistance

The coated panel was tested with a Du Pont impact tester using a weight of 500 g with a tip 0.5 inch in radius. The results were rated in terms of the maximum height (5 cm calibration) at which no cracking was caused by the weight dropped onto the coated panel.

Water resistance

The coated panel was dipped in warm water maintained at 40° C. for 240 hours and washed with water, followed by visual inspection of the coating surface. The evaluation was made on A to C scale: A: no change, B: slight dulling on the coating surface, and C: blushing on the coating surface.

Recoat adhesion

A first topcoat was formed following the above method according to 2-coat 1-bake system. Then the topcoating compositions (base coat composition and clear coat composition) used in the first topcoat were applied to the coated panel in the same manner. Thereafter the coated panel was baked at 120° C. for 30 minutes to make a second topcoat. The coated panel was cut crosswise to reach the substrate, giving 100 squares with a spacing of 1 mm. An adhesive tape was applied to and then peeled from the cut surface. The adhesion between the first and the second topcoats was rated on A to C scale: A: no peeling, B: slightly peeled and C: considerably peeled.

The test results are shown in Table 2.

TABLE 2

| | | Example | | | | |
|---|---|---|---|---|---|---|
| | | 6 | 7 | 8 | 9 | 10 |
| Base coat composition | | Y-1 | Y-1 | Y-1 | M-1 | M-1 |
| Clear coat composition | | Example 1 | Example 2 | Example 5 | Example 1 | Example 5 |
| Property | Film appearance | A | A | A | A | A |
| | Acid resistance | A | A | A | A | A |
| | Scratch resistance | A | A | A | A | A |
| | Impact resistance | 50 | 50 | 50 | 50 | 50 |
| | Water resistance | A | A | A | A | A |
| | Recoat adhesion | A | A | A | A | A |

| | | Comparative Example | | | | |
|---|---|---|---|---|---|---|
| | | 4 | 5 | 6 | 7 | 8 |
| Base coat composition | | Y-1 | Y-1 | Y-1 | M-1 | M-1 |

TABLE 2-continued

| Clear coat composition | | Comp. Example 1 | Comp. Example 2 | Comp. Example 3 | Comp. Example 1 | Comp. Example 3 |
|---|---|---|---|---|---|---|
| Property | Film appearance | A | A | A | A | A |
| | Acid resistance | A | B | A | A | A |
| | Scratch resistance | C | C | C | C | C |
| | Impact resistance | 40 | 40 | 40 | 40 | 40 |
| | Water resistance | A | A | A | A | A |
| | Recoat adhesion | C | A | A | C | A |

According to the present invention, there is provided a novel thermosetting high solids coating composition which can form a coating film excellent in both acid resistance and scratch resistance, and which is superior in storage stability and recoat adhesion. Further provided is a method of forming a topcoat using said composition.

What is claimed is:

1. A thermosetting high solids coating composition comprising:
   (A) a carboxyl-containing compound,
   (B) a polyepoxide, and
   (C) a copolymer prepared by polymerizing monomer components comprising (a) 30 to 50% by weight of vinyltrimethoxysilane and/or vinyltriethoxysilane, (b) 5 to 15% by weight of N-methylol(meth)acrylamide alkyl ether, and (c) 35 to 65% by weight of another polymerizable unsaturated monomer.

2. The composition according to claim 1 which is of an organic solvent and has a solids concentration of about 40 to about 80% by weight.

3. The composition according to claim 1 wherein the compound (A) has an acid value of 50 to 500 mg KOH/g.

4. The composition according to claim 1 wherein the compound (A) is an acrylic polymer having a number average molecular weight of 2,000 to 20,000.

5. The composition according to claim 1 wherein the compound (A) is a half ester formed by the addition reaction of polyol with 1,2-acid anhydride.

6. The composition according to claim 1 wherein the polyepoxide (B) has an epoxy content of 0.8 to 15 mmol/g.

7. The composition according to claim 1 wherein the polyepoxide (B) is an acrylic polymer having a number average molecular weight of 2,000 to 20,000.

8. The composition according to claim 1 wherein the copolymer (C) has a methoxysilyl and/or ethoxysilyl content of 0.5 to 4.0 mmol/g.

9. The composition according to claim 1 wherein the copolymer (C) has a number average molecular weight of 1,000 to 5,000.

10. The composition according to claim 1 wherein the polymerizable unsaturated monomer (c) in the copolymer (C) is a $C_{1-24}$ alkyl ester or a cycloalkyl ester of acrylic acid or methacrylic acid.

11. The composition according to claim 1 wherein the proportion of the compound (A) and the polyepoxide (B) is such that the equivalent ratio of the carboxyl group in the compound (A) to the epoxy group in the polyepoxide (B) is 1:0.5 to 0.5:1, and the proportion of the copolymer (C) is 3 to 200 parts by weight per 100 parts by weight of the combined amount of the compound (A) and the polyepoxide (B).

12. The composition according to claim 1, the composition comprising a curing catalyst.

13. A method for forming a topcoat comprising the step of successively forming a colored base coat and a clear coat on a substrate, said colored base coat and/or clear coat being formed from the composition of claim 1.

14. The method for forming a topcoat according to claim 13, the method comprising the steps of applying the composition for forming the colored base coat to a substrate, applying the composition for forming the clear coat to the uncured surface of the base coat, and curing the two coats by heating according to 2-coat 1-bake system.

15. The method for forming a topcoat according to claim 13 wherein the composition for forming the clear coat is a coating composition comprising:
   (A) a carboxyl-containing compound,
   (B) a polyepoxide, and
   (C) a copolymer prepared by polymerizing monomer components comprising (a) 30 to 50% by weight of vinyltrimethoxysilane and/or vinyltriethoxysilane, (b) 5 to 15% by weight of N-methylol(meth)acrylamide alkyl ether, and (c) 35 to 65% by weight of another polymerizable unsaturated monomer.

16. An article coated by the method according to claim 13.

* * * * *